US012807257B2

(12) United States Patent
Chen

(10) Patent No.: US 12,807,257 B2
(45) Date of Patent: Nov. 24, 2026

(54) BRACKET FOR A MUDGUARD

(71) Applicant: Jalco Industry Co., Ltd., Huatan Township, Changhua County (TW)

(72) Inventor: Han-Tsung Chen, Huatan Township (TW)

(73) Assignee: Jalco Industry Co., Ltd., Huatan Township (TW)

( * ) Notice: Subject to any disclaimer, the term of this patent is extended or adjusted under 35 U.S.C. 154(b) by 168 days.

(21) Appl. No.: 18/967,858

(22) Filed: Dec. 4, 2024

(65) Prior Publication Data

US 2025/0206402 A1 Jun. 26, 2025

(30) Foreign Application Priority Data

Dec. 25, 2023 (TW) ................................ 112214141

(51) Int. Cl.
*B62J 15/02* (2006.01)

(52) U.S. Cl.
CPC .................................... *B62J 15/02* (2013.01)

(58) Field of Classification Search
CPC ........................................................ B62J 15/02
USPC ....................................................... 280/304.3
See application file for complete search history.

(56) References Cited

U.S. PATENT DOCUMENTS 2,126,752 A * 8/1938 Devine .................... B62J 27/30
224/424

FOREIGN PATENT DOCUMENTS

TW M524296 U * 6/2016

* cited by examiner

*Primary Examiner* — Valentin Neacsu
*Assistant Examiner* — Felicia L. Brittman-Alabi
(74) *Attorney, Agent, or Firm* — Wang Law Firm, Inc.

(57) ABSTRACT

A bracket includes a U-shaped element, two threaded bolts, two collars, two stems and two sleeves. The U-shaped element includes an arched section formed between two branches. Each of the branches includes a screw hole. The arched section is connected to a mudguard. Each of the threaded bolts includes a threaded section inserted in the screw hole of one of the branches and a head at an end of the threaded section. The collars receive two sections of a skewer. Each of the stems extends from a corresponding one of the collars and includes a thread. Each of the sleeves includes on an internal face an annular shoulder and a thread engaged with the thread of one of the stems so that the head of each of the threaded bolts is compressed between the corresponding stem and the annular shoulder of the corresponding sleeve.

10 Claims, 8 Drawing Sheets

BRACKET FOR A MUDGUARD

BACKGROUND OF INVENTION

1. Field of Invention

The present invention relates to a mud of a bicycle and, more particularly, to a bracket for a mudguard.

2. Related Prior Art

A mudguard is used above a front or rear wheel of a bicycle to fend water, mud and/or gravel. Thus, a rider is protected from such water, mud and/or gravel. Moreover, a bystander is protected from such water, mud and/or gravel. Furthermore, a brake, a derailleur and/or a lamp is protected from such water, mud and/or gravel.

Conventionally, the mudguard is attached to a fork, chain-stay or seat-stay by two rods. Each of the rods includes an upper end connected to the mudguard and a lower end formed with a collar or loop for receiving a threaded section of a skewer before a nut is engaged with the threaded section. However, to replace the mudguard with a new one, the nuts must be detached from the skewer, and this is troublesome. Moreover, it requires some effort to return the skewer to operation with precision while engaging the nuts with the threaded sections again.

Therefore, the present invention is intended to obviate or at least alleviate the problems encountered in the prior art.

SUMMARY OF INVENTION

It is the primary objective of the present invention to a provide a robust bracket for a mudguard.

To achieve the foregoing objective, the bracket includes a U-shaped element, two threaded bolts, two collars, two stems and two sleeves. The U-shaped element includes an arched section formed between two branches. Each of the branches includes a screw hole. The arched section is connected to a mudguard. Each of the threaded bolts includes a threaded section inserted in the screw hole of one of the branches and a head at an end of the threaded section. The collars receive two sections of a skewer. Each of the stems extends from a corresponding one of the collars and includes a thread. Each of the sleeves includes on an internal face an annular shoulder and a thread engaged with the thread of one of the stems so that the head of each of the threaded bolts is compressed between the corresponding stem and the annular shoulder of the corresponding sleeve.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
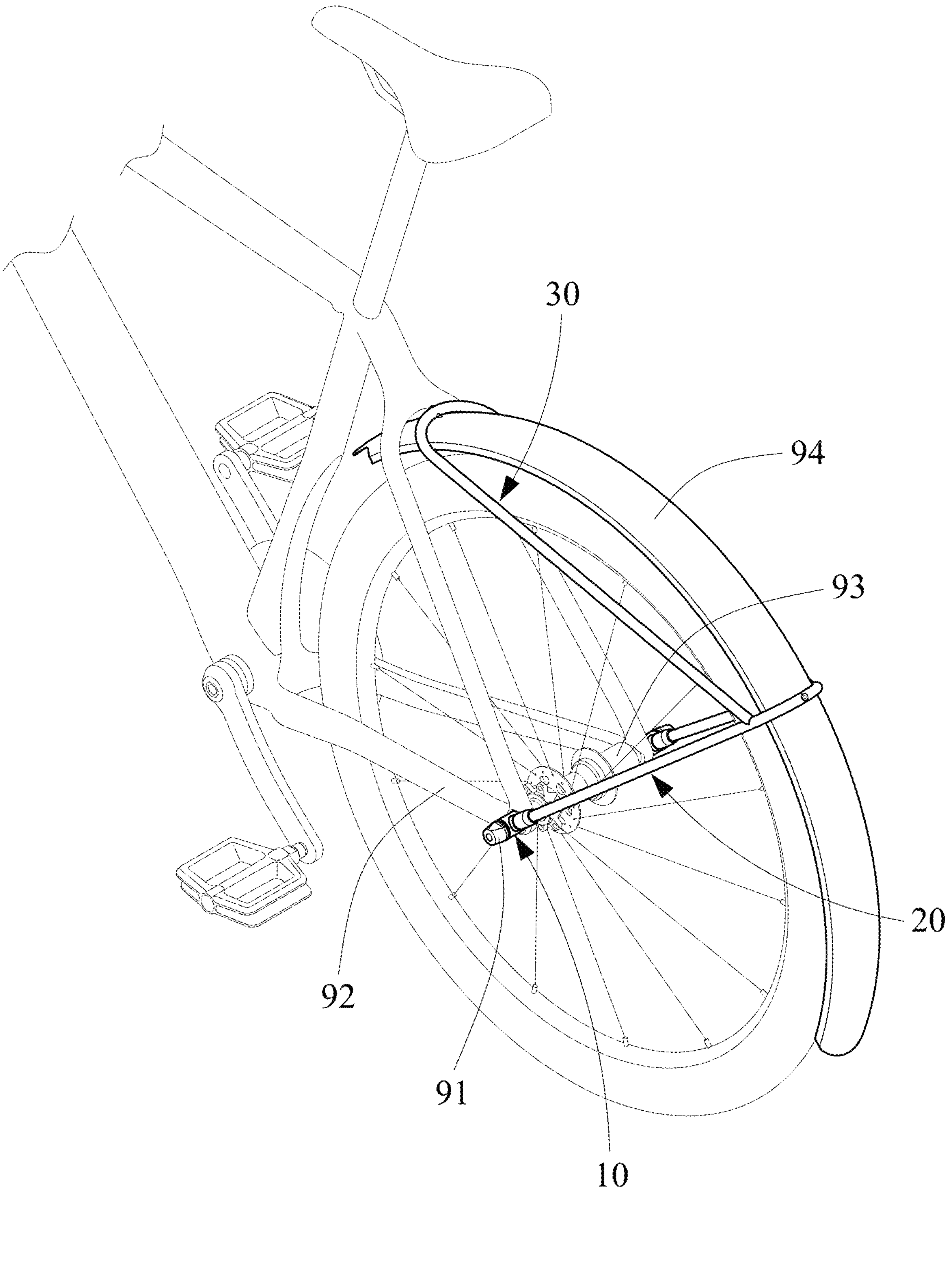
FIG. 1 is a perspective view of a mudguard attached to a bicycle by a bracket according to the preferred embodiment of the present invention.
Figure 2:
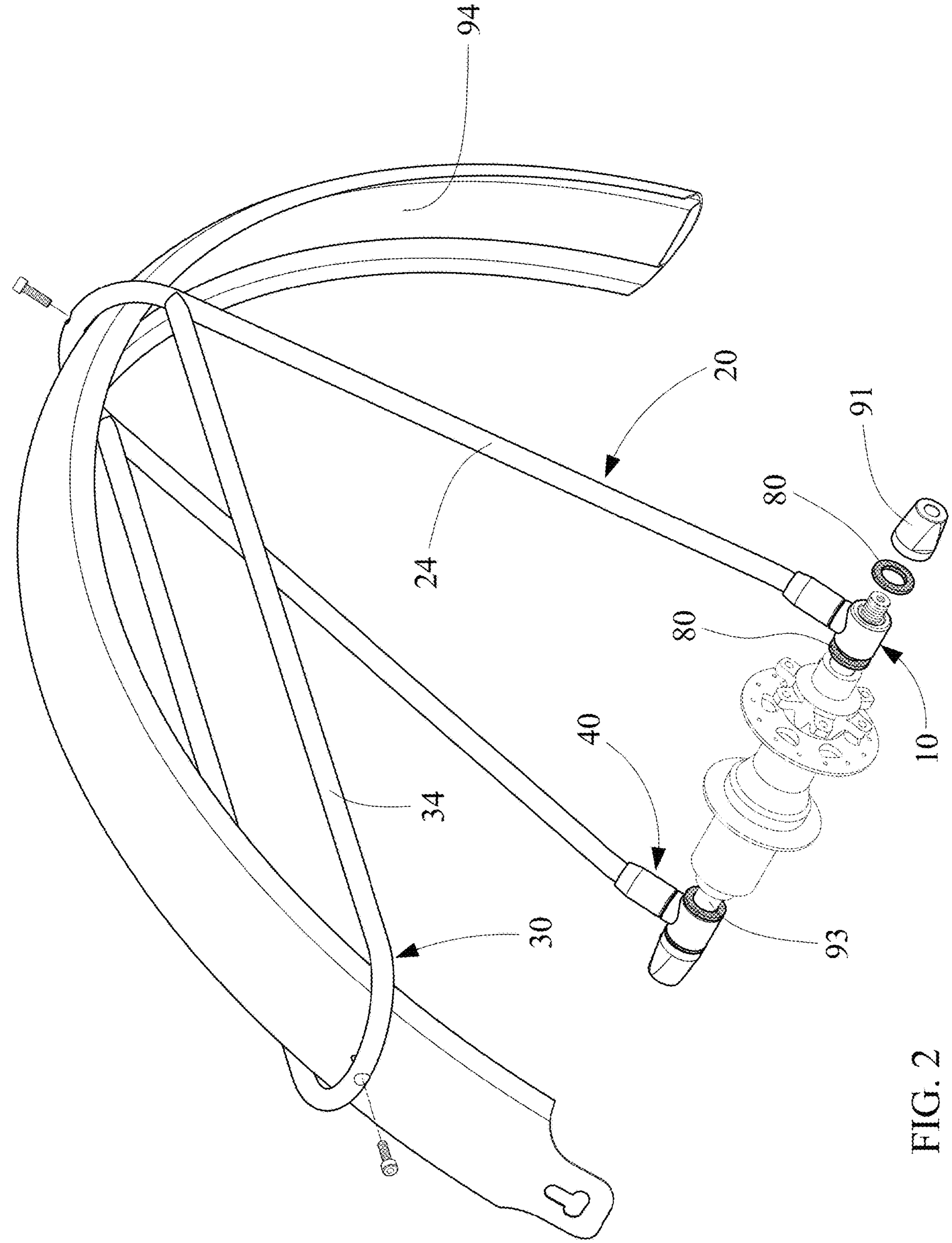
FIG. 2 is a perspective view of the mudguard and the bracket shown in FIG. 1.
Figure 3:
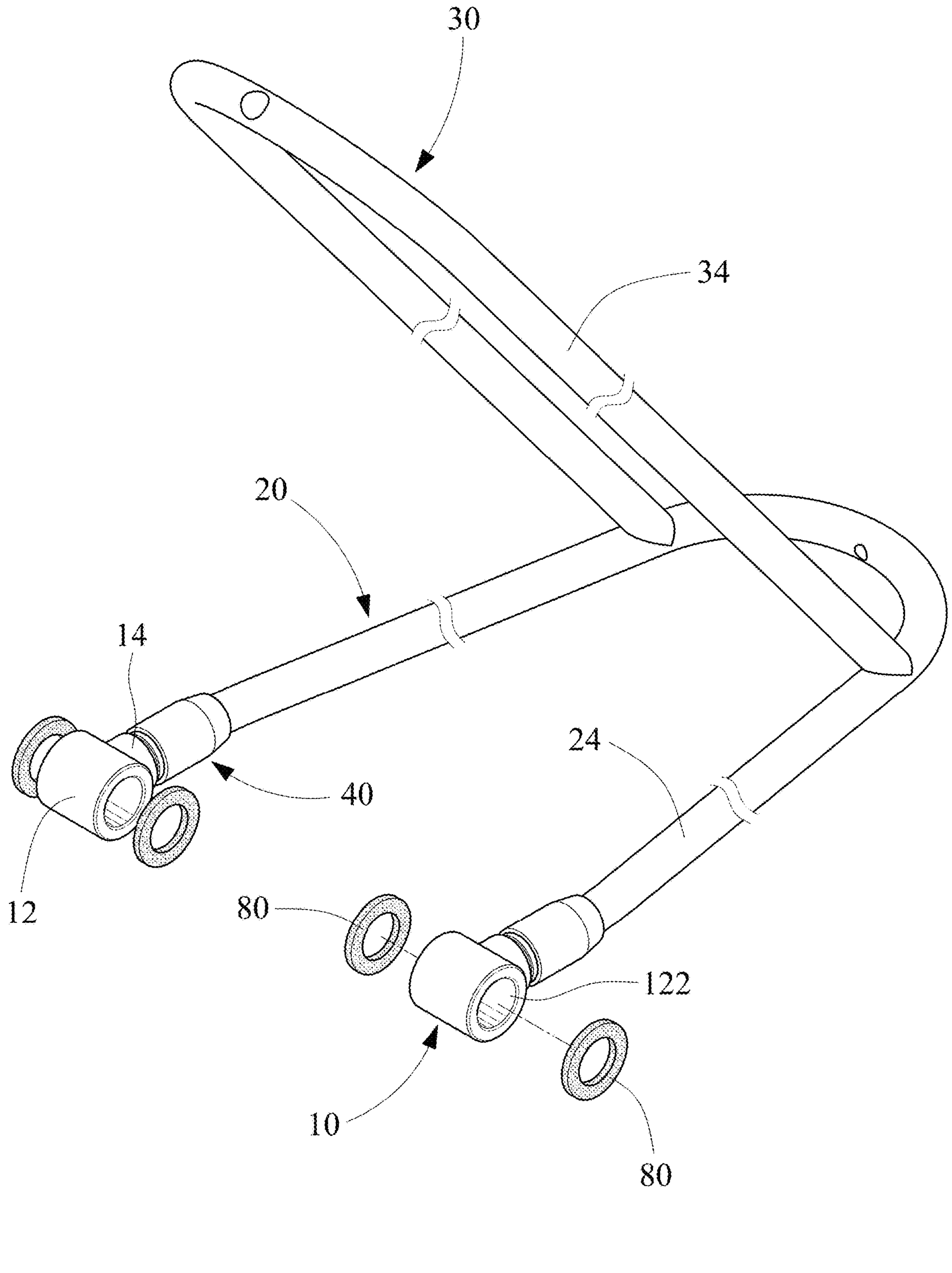
FIG. 3 is a perspective view of the bracket shown in FIG. 2.
Figure 4:
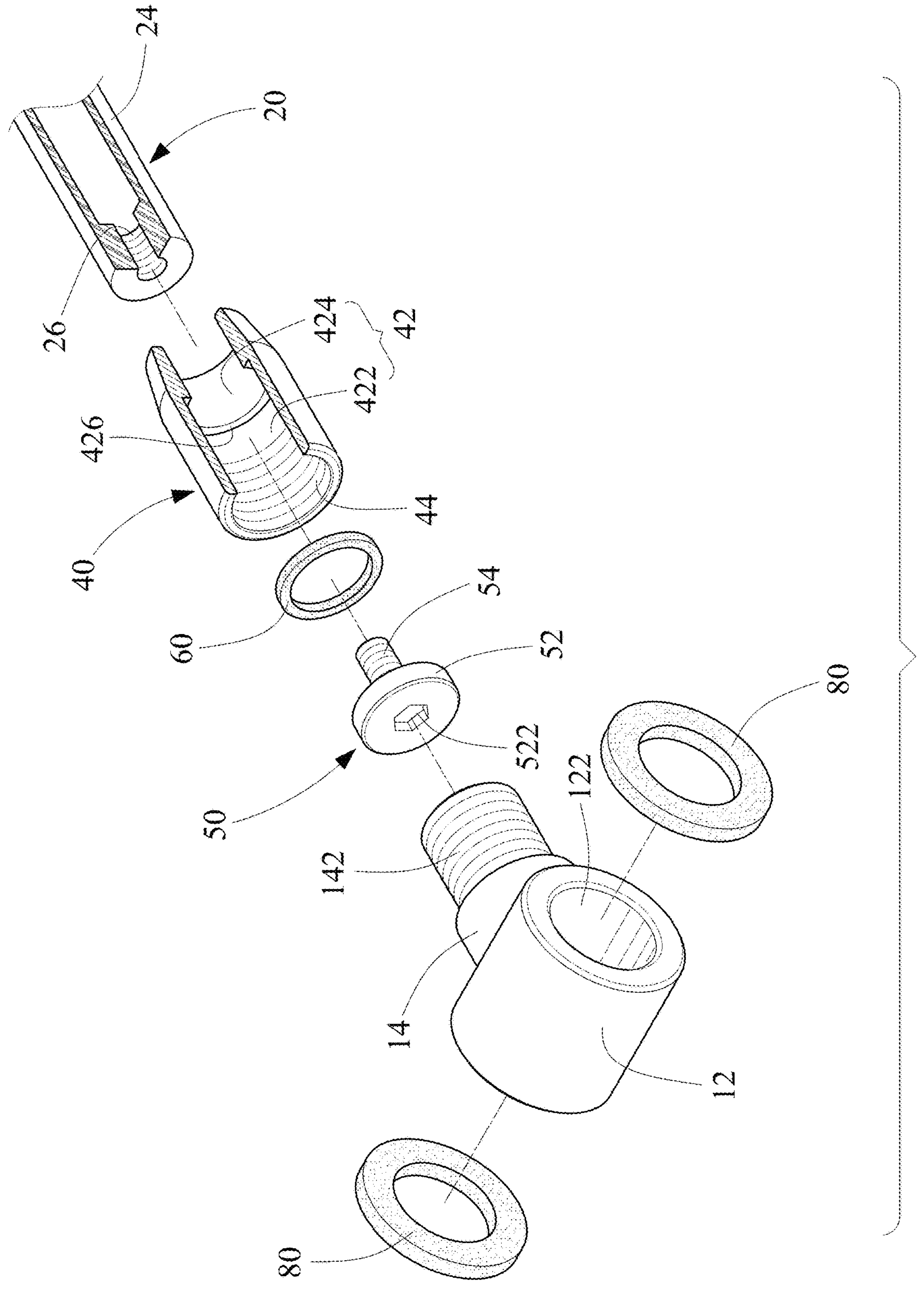
FIG. 4 is a partial and exploded view of the bracket shown in FIG. 3.
Figure 5:
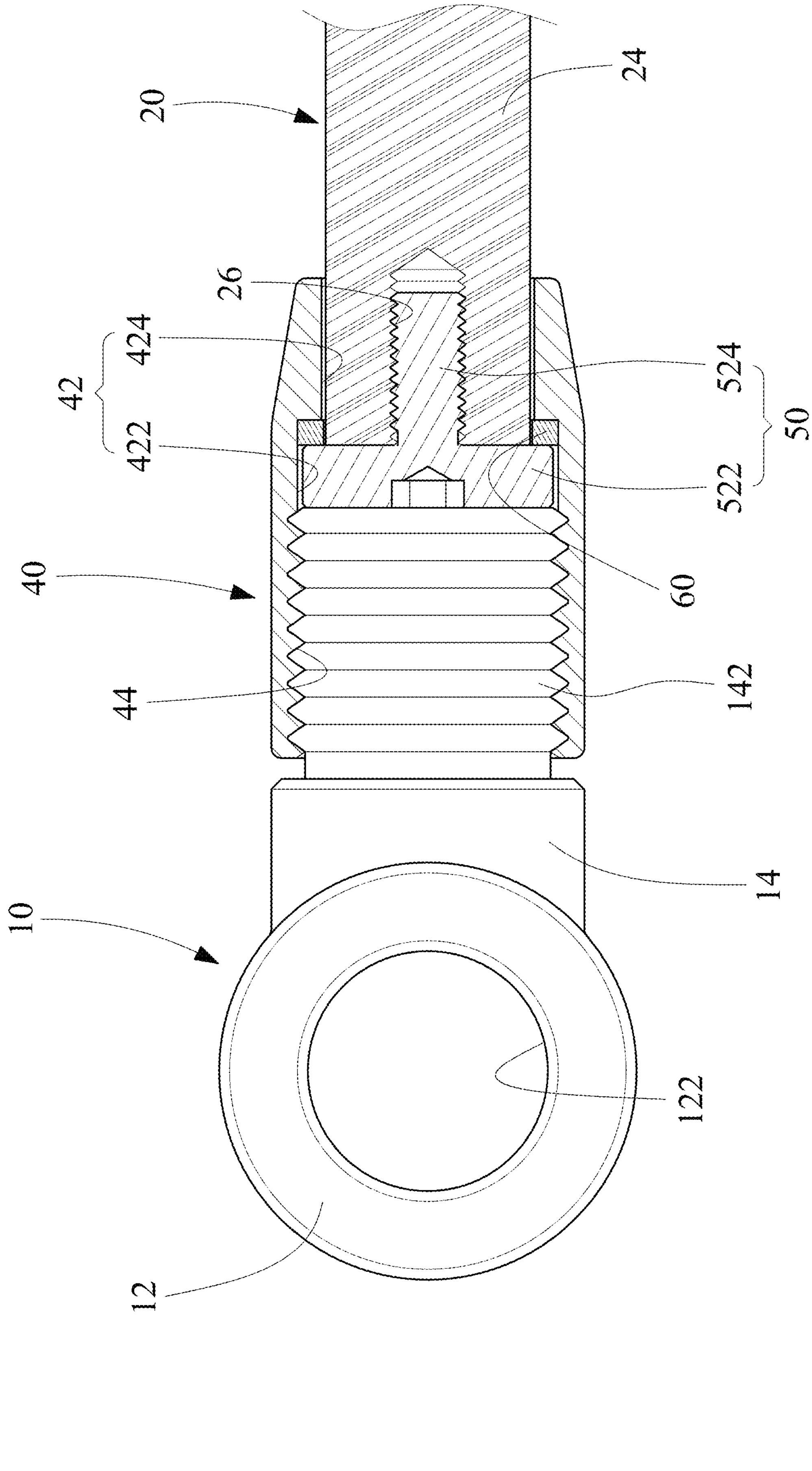
FIG. 5 is a partial and cross-sectional view of the bracket depicted in FIG. 3.
Figure 6:
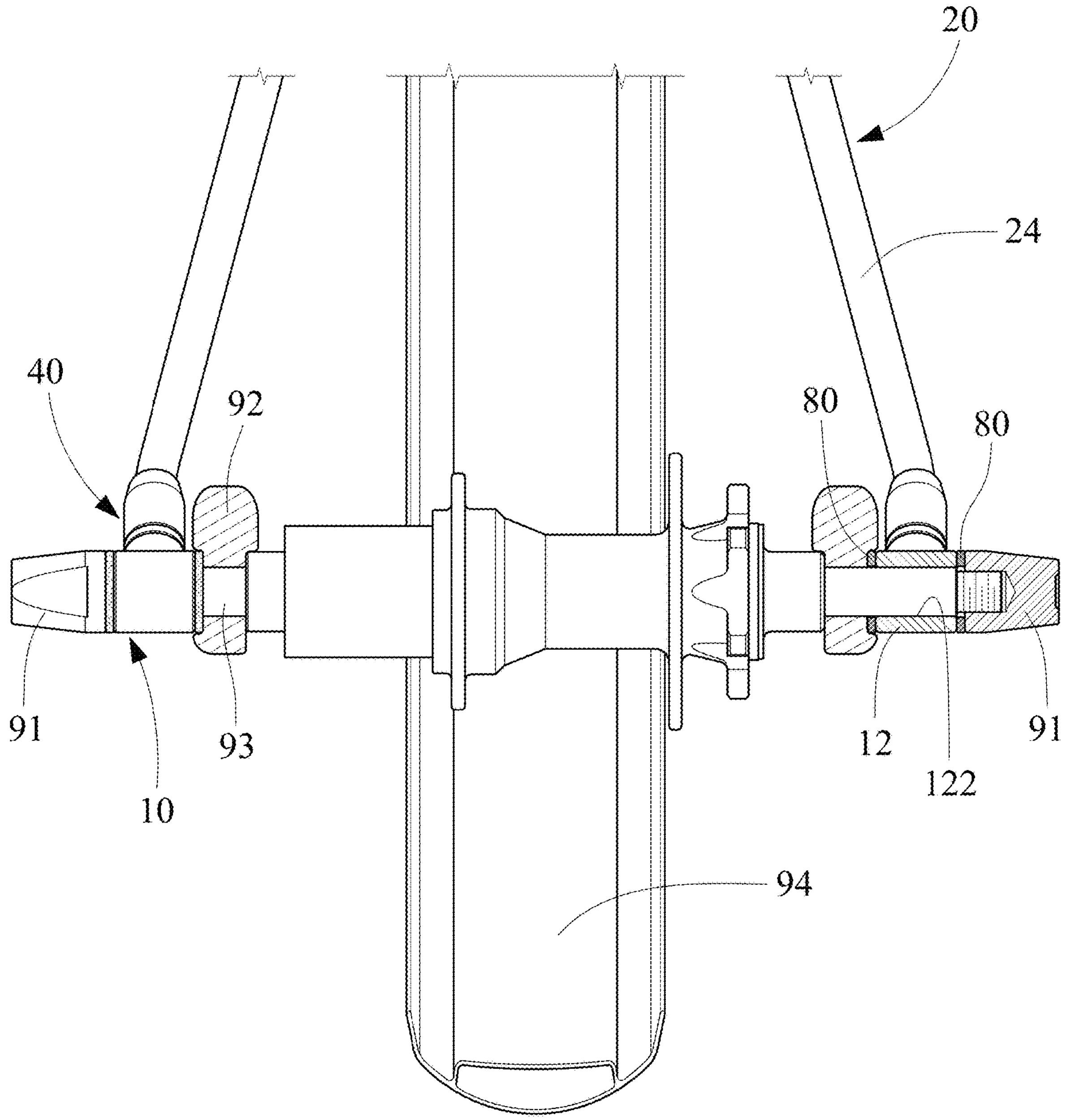
FIG. 6 is a partial and cross-sectional view of the bicycle and the bracket depicted in FIG. 2.
Figure 7:
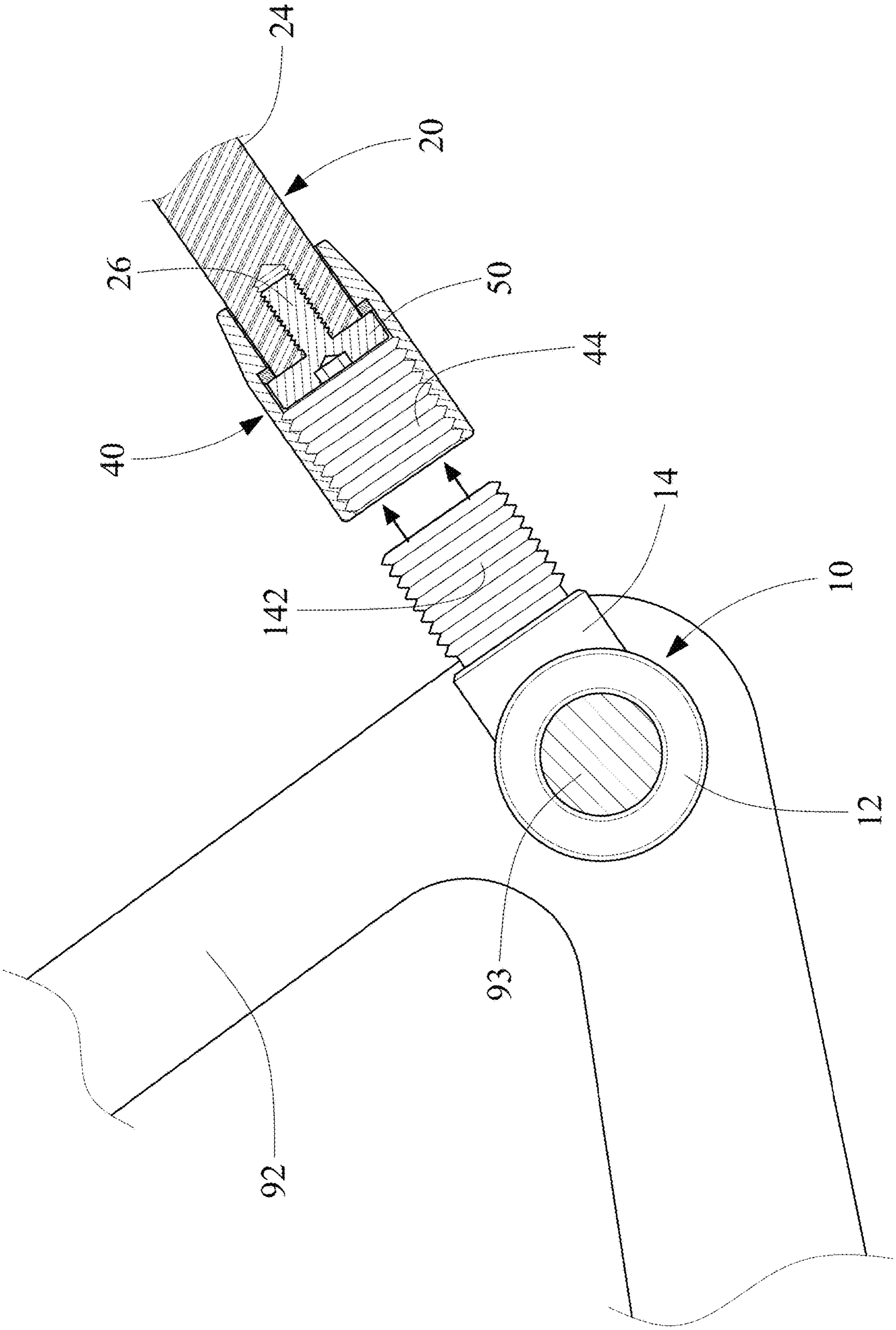
FIG. 7 is a partial and cross-sectional view of the bracket in another position than shown in FIG. 3.

Referring to FIGS. 1 through 7, a mudguard 94 is attached to a frame 92 of a bicycle by a skewer (or "axle") 93, two nuts 91 and a bracket according to the preferred embodiment of the present invention. The skewer 93 is used to attach a wheel to a chain-stay or seat-stay (not numbered) of the frame 92 or a fork (not shown) of the bicycle. The nuts 91 are respectively engaged with two threaded sections of the skewer 93.

Figure 8:
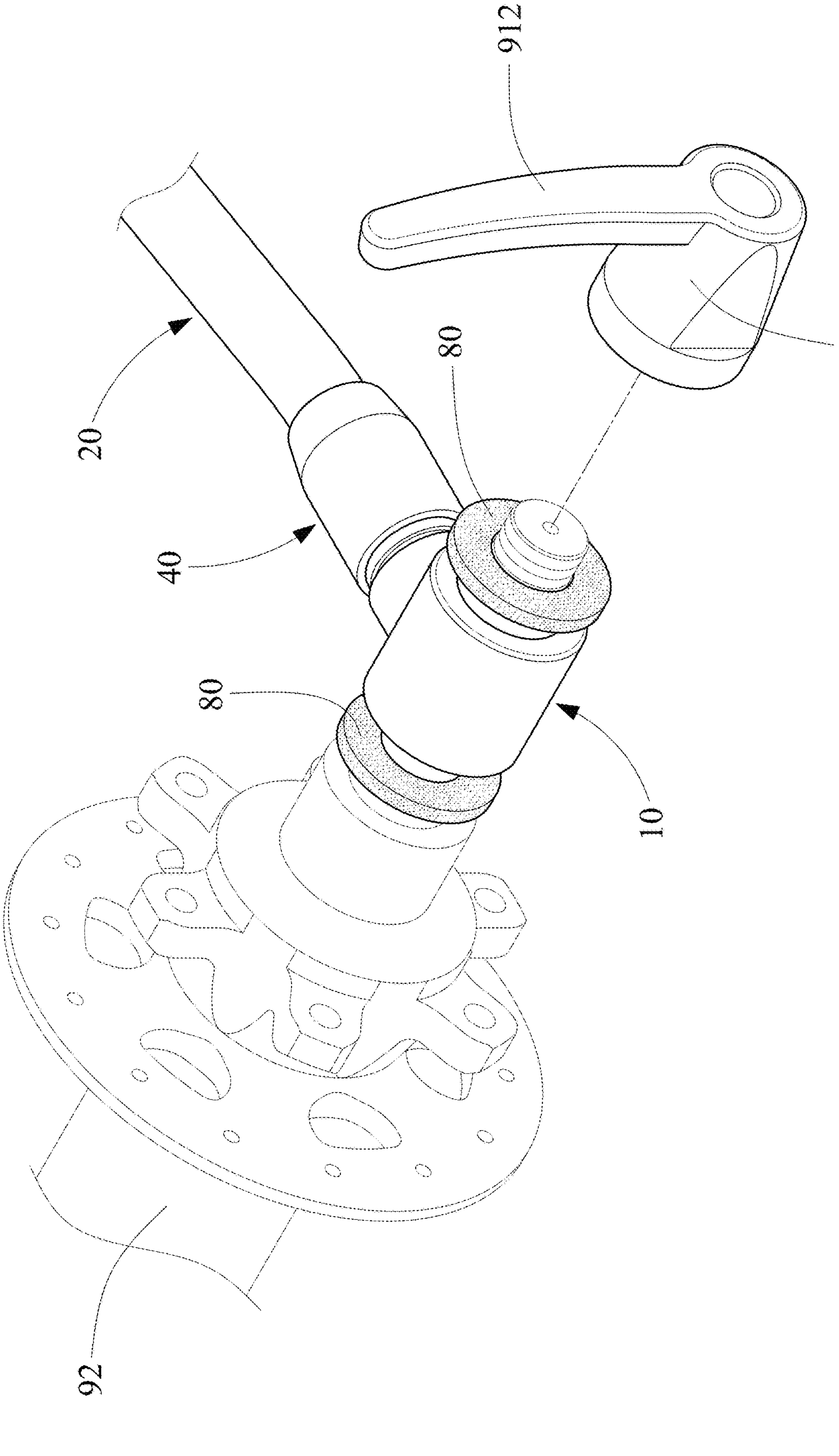
FIG. 8 is a perspective view of another nut for engagement with a threaded section of a skewer to keep the bracket on the bicycle shown in FIG. 1.

Referring to FIG. 8, each of the nuts 91 is formed with a lever 912 operable to rotate the nut 91 in another embodiment.

The bracket includes two connectors 10, two U-shaped elements 20 and 30, two sleeves 40 and two threaded bolts 50. The U-shaped elements 20 and 30 are connected to each other by welding for example. The connectors 10 are used to attach the U-shaped element 20 to the chain-stay, seat-stay or fork.

The U-shaped element 20 includes an arched section formed between two rectilinear branches 24. Each of the branches 24 includes a screw hole 26 in an end.

The U-shaped element 30 includes an arched section formed between two branches 34. The branches 34 are respectively connected to the branches 24 by welding for example. There is an angle between each branch 34 and the corresponding branch 24. However, the U-shaped element 30 can be omitted in another embodiment.

Each of the connectors 10 includes a collar 12 made in one piece with a stem 14. An axis of the collar 12 is in perpendicular to an axis of the stem 14. The stem 14 is formed with a thread 142. The collar 12 receives a section of the skewer 93. The collar 12 includes a side in contact with a branch of the chain-stay, seat-stay or fork and another side in contact with one of the nuts 91.

Each of the sleeves 40 includes an axial passageway 42 with two sections 422 and 424. The diameter of the section 422 is larger than the diameter of the section 424 so that an annular shoulder 426 is formed between the sections 422 and 424. Each of the sleeves 40 further includes a thread 44 formed on the wall of the section 422.

Each of the threaded bolts 50 includes an enlarged flat head 52 formed at an end of a threaded section 54. A diameter of the head 52 is marginally smaller than an external diameter of the annular shoulder 426 (the diameter of the section 422) and larger than an internal diameter of the annular shoulder 426 (the diameter of the section 424). The head 52 is formed with a non-circular bore 522 for receiving an end of an Allen wrench operable to rotate the threaded bolt 50. The threaded section 54 is shaped corresponding to the screw hole 26.

To attach the mudguard 94 to the chain-stay, seat-stay or fork by the bracket, the arched section of the U-shaped element 20 is attached to a portion of the mudguard by a screw, and the arched section of the U-shaped element 30 is attached to another portion of the mudguard by another screw.

The nuts 91 are disengaged from the threaded sections of the skewer 93. Then, the skewer 93 is inserted in the collars 12 and two branches of the chain-stay, seat-stay or fork. Then, the nuts 91 are engaged with the threaded sections of the skewer 93.

Each of the threaded bolts 50 is movably inserted in one of the sleeves 40. The threaded section 54 of each of the threaded bolts 50 is inserted in the screw hole 26 of each of the branches 24. The thread 44 of each of the sleeves 40 is engaged with the thread 142 of the stem 14 of one of the connectors 10. Thus, the head 52 of each of the threaded bolts 50 is sandwiched between the annular shoulder 426 of one of the sleeves 40 and the stem 14 of one of the connectors 10. Thus, the mudguard 94 extends above a rear or front wheel.

Advantageously, each threaded bolt 50 is rotatable relative to the corresponding branch 24 so that the length of the combination of the former with the latter is adjustable. Accordingly, the elevation of the mudguard 94 above the wheel is adjustable.

The mudguard 94 is easily replaceable with a new one by disengaging the sleeves 40 from the stems 14 before disengaging the threaded bolts 50 from the branches 24. There is no need to disengage the nuts 91 from the skewer 93 which might otherwise interfere with the positioning of the skewer 93.

Preferably, a washer 60 is arranged between the annular shoulder 426 of each of the sleeves 40 and the head 52 of one of the threaded bolts 50.

Two washers 80 are preferably used on the sides of each of the collars 12. The following description will be given to only one of the collars 12 and the corresponding washers 80. One of the washers 80 is sandwiched between one of the sides of the collar 12 and a branch of the chain-stay, seat-stay or fork. The remaining one of the washers 80 is sandwiched between the remaining one of the sides of the collar 12 and the corresponding nut 91. However, the washers 80 can be omitted.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A bracket including:

a primary U-shaped element (20) including two branches (24) and an arched section formed between the branches (24), wherein each of the branches (24) includes a screw hole (26), wherein the arched section is connected to a mudguard (94);

two threaded bolts (50) each of which includes a threaded section (54) inserted in the screw hole (26) of one of the branches (24) and a head (52) at an end of the threaded section (54);

two collars (12) for receiving two sections of a skewer (93);

two stems (14) each of which extends from a corresponding one of the collars (12) and includes a thread (142); and two sleeves (40) each of which includes a passageway (42) including a larger section (422) for receiving the head (52) of the corresponding threaded bolt (52) and a smaller section (424) for receiving the corresponding branch (24), an annular shoulder (426) between the larger and smaller sections (422, 424), and a thread (44) engaged with the thread (142) of one of the stems (14) so that the head (52) of each of the threaded bolts (50) is compressed between the corresponding stem (14) and the annular shoulder (426) of the corresponding sleeve (40).

2. The bracket according to claim 1, further including a washer (62) sandwiched between the head (52) of each of the threaded bolts (50) and the annular shoulder (426) of each of the sleeves (40).

3. The bracket according to claim 1, wherein each of the threaded bolts (50) includes a non-circular bore (522) in the head (52).

4. The bracket according to claim 1, further including a washer (80) between each of the collars (12) and a portion of a frame (92) of a bicycle.

5. The bracket according to claim 1, further including two washers (80) respectively on two sides of each of the collars (12).

6. A bracket including:

a primary U-shaped element (20) including two branches (24) and an arched section formed between the branches (24), wherein each of the branches (24) includes a screw hole (26), wherein the arched section is connected to a mudguard (94);

two threaded bolts (50) each of which includes a threaded section (54) inserted in the screw hole (26) of one of the branches (24) and a head (52) at an end of the threaded section (54);

two collars (12) for receiving two sections of a skewer (93);

two stems (14) each of which extends from a corresponding one of the collars (12) and includes a thread (142); and two sleeves (40) each of which includes on an internal face an annular shoulder (426) and a thread (44) engaged with the thread (142) of one of the stems (14) so that the head (52) of each of the threaded bolts (50) is compressed between the corresponding stem (14) and the annular shoulder (426) of the corresponding sleeve (40); and a secondary U-shaped element (30) with two branches (34) and an arched section formed between the branches (34) of the secondary U-shaped element (30), wherein the branches (34) of the secondary U-shaped element (30) are respectively connected to the branches (24) of the primary U-shaped element (20), wherein the arched section of the secondary U-shaped element (30) is connected to the mudguard (94).

7. The bracket according to claim 6, wherein each of the branches (24) of the primary U-shaped element (20) extends at an angle from the corresponding branch (34) of the secondary U-shaped element (30).

8. A bracket including:

a primary U-shaped element (20) including two branches (24) and an arched section formed between the branches (24), wherein each of the branches (24) includes a screw hole (26), wherein the arched section is connected to a mudguard (94);

two threaded bolts (50) each of which includes a threaded section (54) inserted in the screw hole (26) of one of the branches (24) and a head (52) at an end of the threaded section (54);

two collars (12) for receiving two sections of a skewer (93);

two stems (14) each of which extends from a corresponding one of the collars (12) and includes a thread (142); and two sleeves (40) each of which includes on an internal face an annular shoulder (426) and a thread (44) engaged with the thread (142) of one of the stems (14) so that the head (52) of each of the threaded bolts (50) is compressed between the corresponding stem (14) and the annular shoulder (426) of the corresponding sleeve (40); and two nuts (91) engaged with two threaded sections of the skewer (93), thereby keeping the collars (12) on the skewer (93).

9. The bracket according to claim 8, further including a washer (80) between each of the collars (12) and one of the nuts (91).

10. The bracket according to claim 8, wherein each of the nuts (91) includes a lever (912).

* * * * *